United States Patent [19]

Gerlach

[11] Patent Number: 5,520,362
[45] Date of Patent: May 28, 1996

[54] MASTER-SLAVE VEHICLE SEAT ADJUSTER

[75] Inventor: Bernd H. Gerlach, New Baltimore, Mich.

[73] Assignee: General Motors Corporation, Detroit, Mich.

[21] Appl. No.: 238,825

[22] Filed: May 6, 1994

[51] Int. Cl.$^6$ .................................... F16M 13/00
[52] U.S. Cl. ........................... 248/429; 248/430
[58] Field of Search ................... 248/429, 425, 248/416, 419, 424, 430; 296/65.1; 297/344.1

[56] References Cited

U.S. PATENT DOCUMENTS

| | | | |
|---|---|---|---|
| 4,043,529 | 8/1977 | Pickles | 248/419 |
| 4,580,755 | 4/1986 | Rees | 248/424 |
| 4,660,795 | 4/1987 | Ikegaya et al. | 248/430 |
| 4,742,983 | 5/1988 | Nihei | 248/429 |
| 4,852,846 | 8/1989 | Weier | 248/430 |
| 4,958,799 | 9/1990 | Claun et al. | 248/430 |
| 5,052,751 | 10/1991 | Hayakawa et al. | 297/341 |
| 5,076,529 | 12/1991 | Dove et al. | 248/429 |
| 5,161,765 | 11/1992 | Wilson | 248/425 |

Primary Examiner—Karen J. Chotkowski
Assistant Examiner—Anita M. King
Attorney, Agent, or Firm—Ernest E. Helms

[57] ABSTRACT

The present invention provides, in a preferred embodiment, a vehicle seat adjuster particularly suitable for the middle or forward seating of a three-row van or minivan type vehicle. The seat adjuster may be provided with a master-slave latch arrangement allowing adjustment by the vehicle seat occupant by manipulating a rod extending toward the front of the vehicle seat adjuster or by a vehicle occupant seated rearwardly manipulating a second rod extending toward the rearward end of the vehicle seat adjuster. Although particularly useful in van-type vehicles, this seat adjuster may also be used in conventional passenger vehicles. The seat adjuster has two latches which are moved to a nonengaged or release position by manipulation of a slidably mounted roller which is displaced by a rod to tension a cable connected to both of the latches.

6 Claims, 9 Drawing Sheets

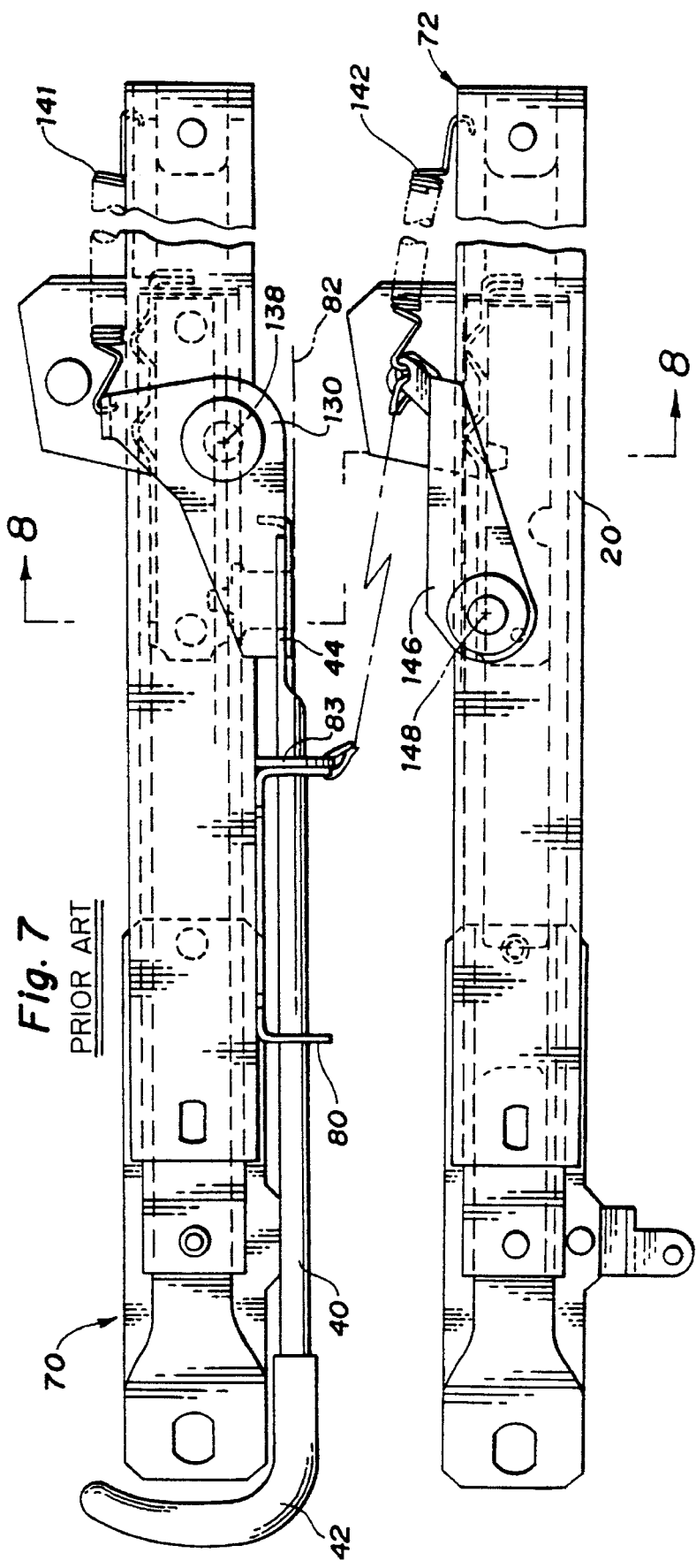
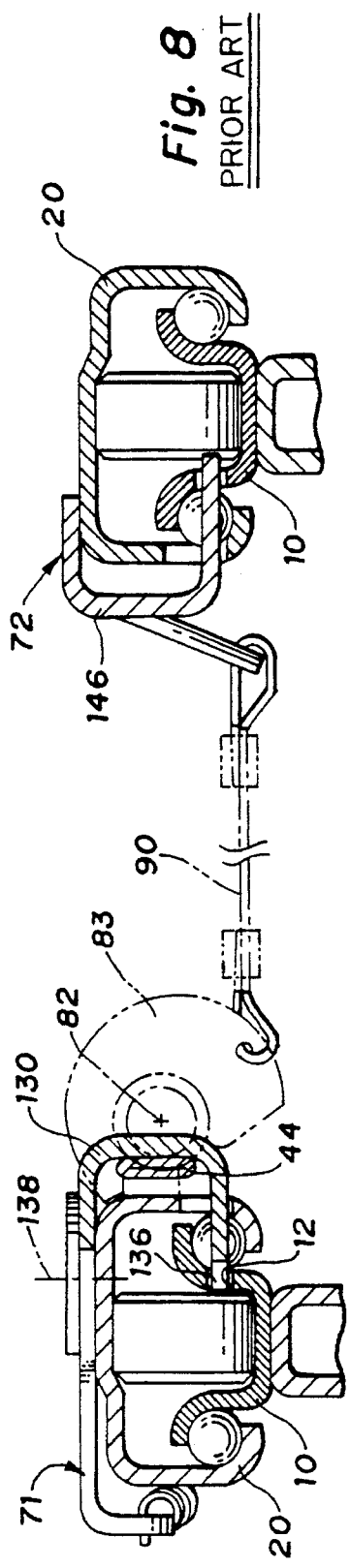
Fig. 7
PRIOR ART
Fig. 8
PRIOR ART

MASTER-SLAVE VEHICLE SEAT ADJUSTER

The field of the present invention is that of manual vehicle seat adjusters adjustable in a fore and aft orientation.

BACKGROUND OF THE INVENTION

A typical seat adjuster slide has a floor channel which is fixably connected to the vehicle floor.

The word "channel" is an industry term and is sometimes synonymously called a rail. The word "channel" as used in this application refers to such a member whether or not such member has a channel-shaped cross-sectional profile.

Slidably mounted on the lower channel is an upper or seat channel connected to the vehicle seat. The lower channel has a series of longitudinally spaced notches. Pivotally connected in a vertical or horizontal plane to the upper channel is a latch having a tab which can be selectively engaged with one of the notches of the lower channel to set the position of the seat within the vehicle. A quadmounted seat will typically have two virtually identical slide master-slave horizontally latched units mounted in parallel to each other. A cable connects the slave latch to the master latch. A pull on the handle causes simultaneous operation of both latches. An example of a horizontally latched quadmounted seat adjuster is shown and described in Borlinghaus et al, U.S. Pat. No. 4,881,827.

SUMMARY OF THE INVENTION

The present invention (illustrated in FIGS. 9 through 13) provides a master-slave seat adjuster which is an alternative to that shown in the aforementioned Borlinghaus et al patent and is more suitable in van-type seating for the middle seats where it is desirable to adjust the position of the seat from a front end by the seat occupant or from the rear end by a passenger seated rearward of the seat.

BRIEF DESCRIPTION OF THE DRAWINGS

FIG. 7 is a top plan view of a seat adjuster of Borlinghaus et al with a horizontal latch.

FIG. 8 is a view taken along line 8—8 of FIG. 7.

DESCRIPTION OF THE PREFERRED EMBODIMENT

Figure 1:
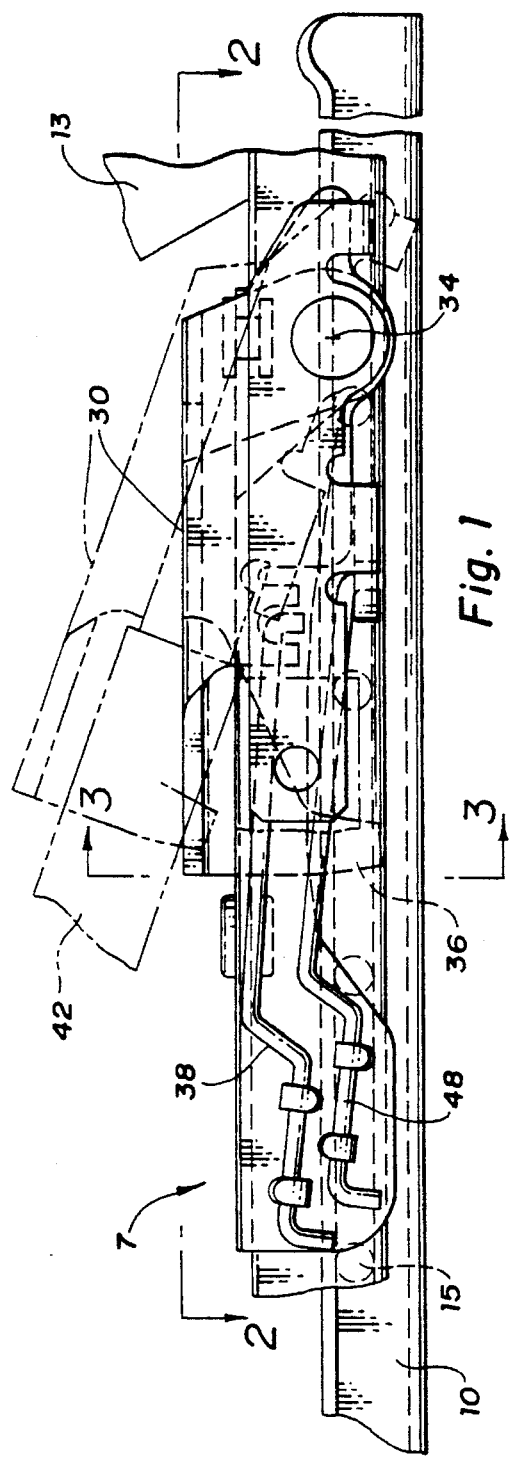
FIG. 1 is a side elevational view with portions cut away of a preferred embodiment seat adjuster slide according to Borlinghaus et al.
Figure 2:
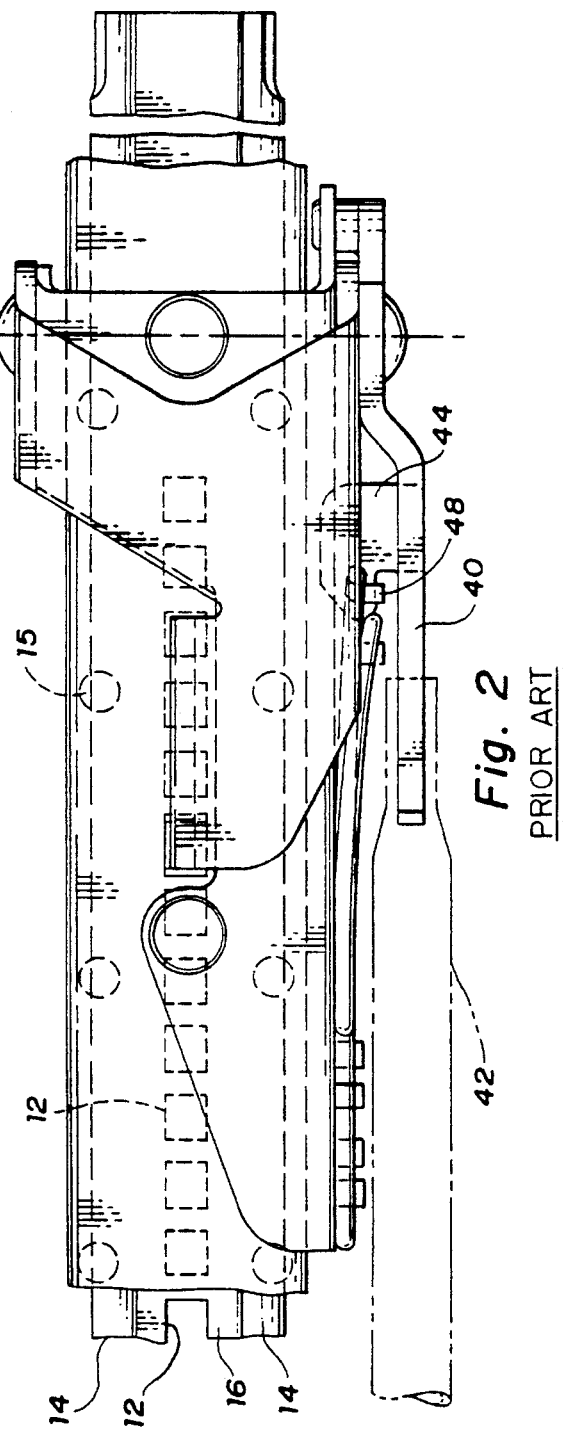
FIG. 2 is a top plan view of the seat adjuster slide illustrated in FIG. 1.

Referring to FIGS. 1 through 4, the manually operable vehicle seat adjuster slide 7 of Borlinghaus et al has a floor or lower channel 10. The lower channel 10 is typically connected to the vehicle 9 in a fore and aft direction. The floor channel 10 has an outer member 14 and an inner member 16 with a series of longitudinally spaced notches 12.

Figure 3:
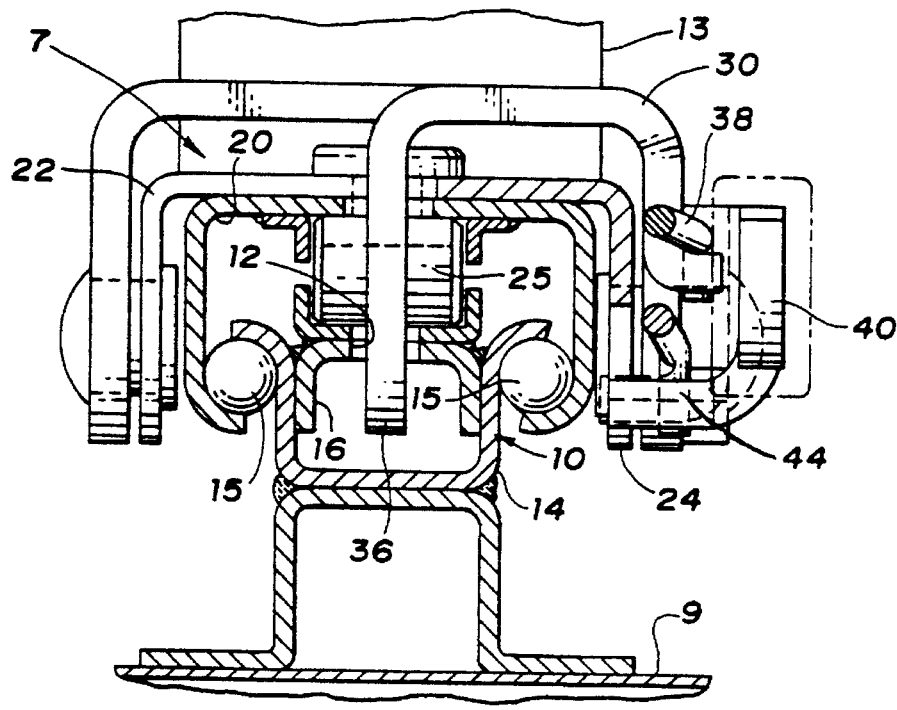
FIG. 3 is a view along line 3—3 of FIG. 1.

Slidably mounted on top of the lower channel 10 is the seat or upper channel 20. The upper channel 20 is separated from the lower channel 10 by ball bearings 15 and is spaced from the lower channel by rollers 25 (FIG. 3). The upper channel 20 is connected to the vehicle seat 13 (most of the seat 13 has been deleted for clarity of illustration) and is interlocked with the lower channel. Fixably connected to the upper channel 20 is a saddle 22. The saddle 22 has an extension 24 which is lower than the top surface of the upper channel 20.

Movement of the top channel 20 is relationship to the lower channel 10 provides the fore and aft adjustment of the seat 13. To set the position of the seat 13, there is a latch 30. The latch 30 is pivotably attached to the saddle lower extension 24 along an axis 34. The latch has a tab 36 which can be selectively engaged with one of the notches 12 of the lower channel 10 to fix the position of the seat 13 within the vehicle 9. A first rod spring 38 biases the latch 30 to position tab 36 into engagement with the lower channel notches 12.

Having a common pivotal axis with the latch 30 and being pivotally connected also to the saddle lower extension 24 is the lift bar 40. The lift bar has a tab 44 for engagement with the latch 30. The lift bar 40 has extending therefrom a handle 42 which, in a quadmount-type seat adjuster, is U-shaped and connects to both lift bars 40 of the parallel mounted adjuster slide 7 of the seat adjuster.

Figure 6:
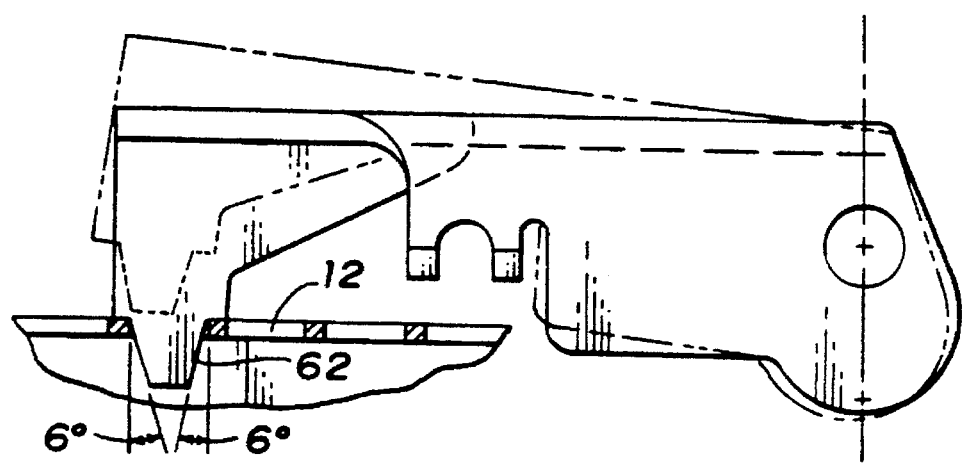
FIG. 6 is a view of a latch on a seat adjuster slide prior to Borlinghaus et al.
Figure 9:
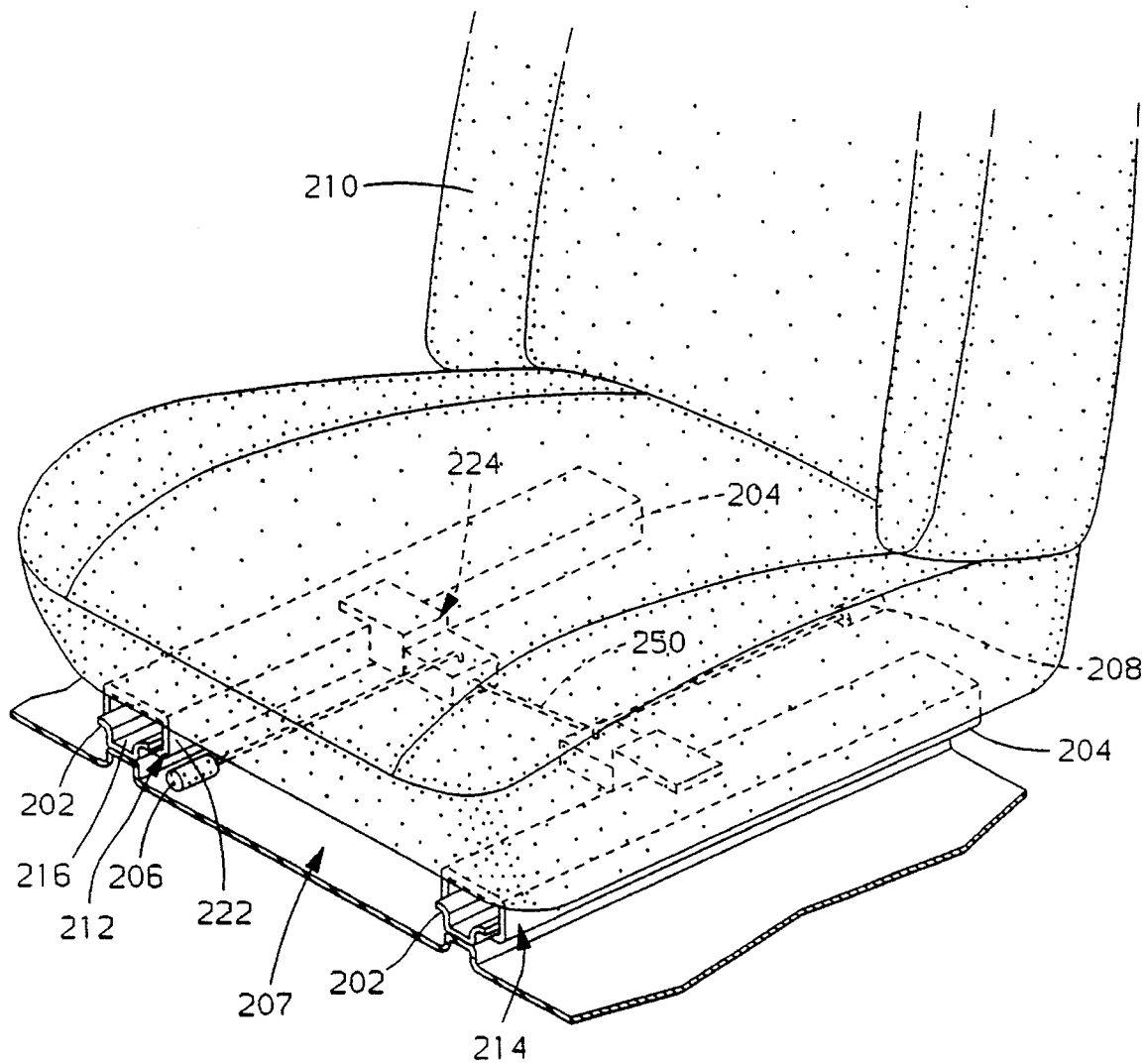
FIG. 9 is a perspective view of a preferred embodiment seat adjuster according to the present invention shown with a vehicle seat placed thereon.

Referring to the above-noted Figures and additionally to FIG. 6, there is a latch 60 provided of an adjuster slide prior to that of Borlinghaus et al. The tab 61 of the prior latch 60 has a generally straight surface profile(s) 62 providing a cam angle of approximately six degrees when fully engaged into a notch 12 of the lower channel (locked position).

Figure 4:
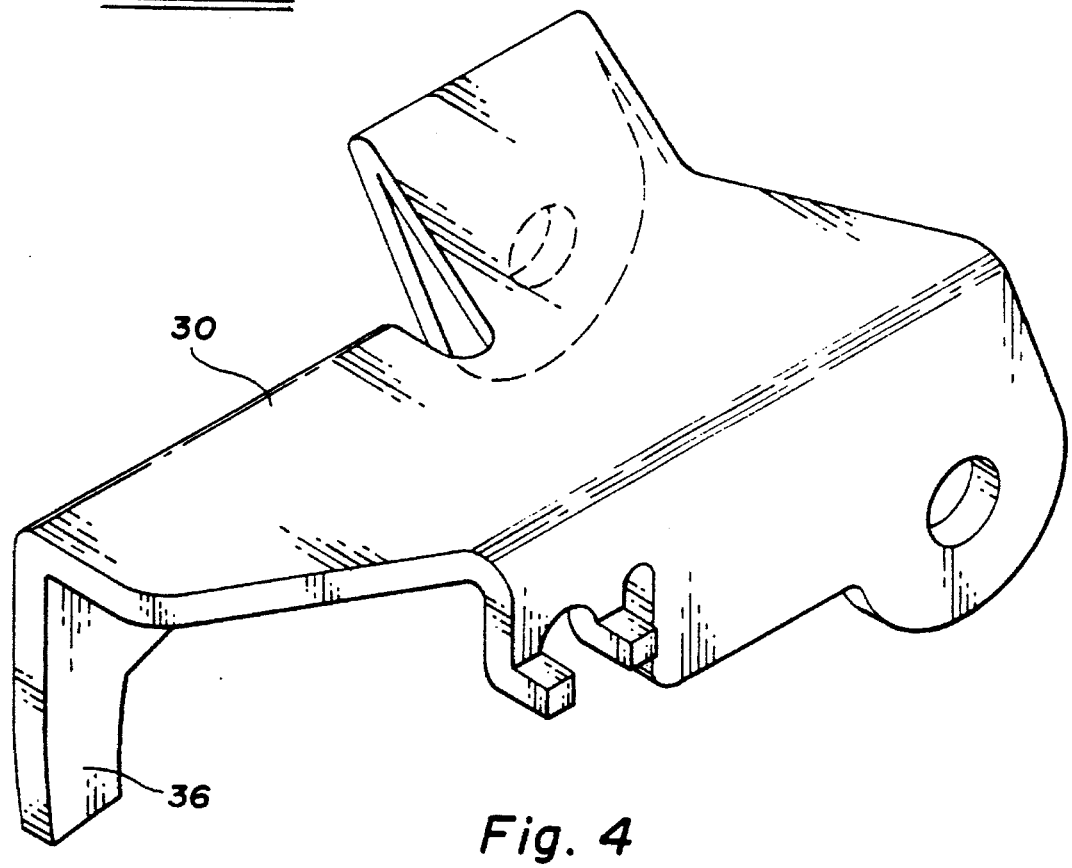
FIG. 4 is a perspective view of the latch of the slide of Borlinghaus et al.
Figure 5:
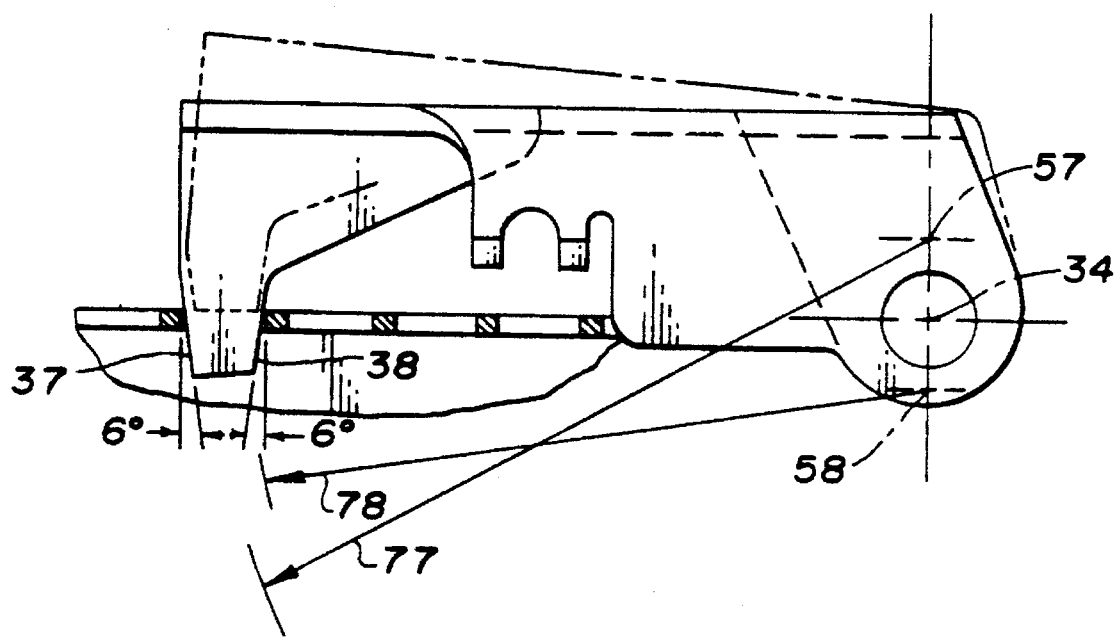
FIG. 5 is an enlarged side elevational view of the latch shown in FIG. 4.

Referring to the latch 30 and the adjuster slide in FIGS. 4 and 5 of Borlinghaus et al, a line drawn between the latch pivotal axis 34 and the point of initial engagement (contact) of the tab 36 with the notch 12 will be generally parallel and co-linear with the lower channel 10. Ideally, the curvilinear profiles 37, 38 of the tab 36 should be that of a spiral ramp.

For simplicity of manufacturing, the profiles 37, 38 can be provided by the projected radius of two circles having centers 57, 58 offset perpendicularly from the pivotal axis 34 of the latch 30. For the most outer profile 37, the center 57 will be offset above the pivotal axis 34 of the latch on a line generally perpendicular to the lower channel 10. The inner profile 38 will have a center 58 offset below the pivotal axis 34 of the latch on a line generally perpendicular to the lower channel 10.

In operation, the operator grabs the handle 42 connected to the lift bar 40. The lift bar will be in a first angular released position. Upon angularly pivoting the lift bar 40 upward against the biasing force of spring 48, the lift bar will enter into a second angular positional range, causing the stub 44 of the lift bar to contact and pivotally move the latch 30 against the action of the spring 38. Continued movement of the lift bar 40 upward will cause the latch 30 to continue to pivot and pull the tab 36 from engagement with the notch 12, allowing the vehicle seat 13 to be adjustably moved to its next desired position.

The seat occupant moves the seat to the next desired position and releases the handle 42. Upon release of the handle 42, lift bar 40 will pivot downward under the influence of gravity assisted by the springs 38. The spring 48 will cause the lift bar 40 and the latch 30 to pivot downwardly.

Referring to FIGS. 7 and 8, a seat adjuster 70 with master 71 slave 72 horizontally latched adjuster slide assemblies is provided. Similar components are referenced with the same reference numerals of FIGS. 1 through 4. The master-slave assembly 71, 72 has a generally horizontal latch 136 with a generally vertical pivotal axis 138 biased to engagement by spring 141. A bracket 80 pivotally mounts lift bar 40 along a generally horizontal pivotal axis 82 perpendicular to pivotal axis 138.

Lift bar 40 has a handle 42 and, at an opposite end, a flat 44. A collar 83 allows the lift bar 40 to be connected to spring-biased slave latch 146 via a flexible connector cable 90. The slave latch 146 has a generally vertical pivotal axis 148.

In operation, lift bar 40 is twisted clockwise (as shown in FIG. 8) along pivotal axis 82. By virtue of the twist motion of lift bar 40, space underneath the seat can be conserved since the lift bar does not have to be pulled over like prior lift bars for horizontal latched seat adjusters. Flat 44 adjacent to latch 130 causes latch 130 to pivot counterclockwise (as shown in FIG. 7) to release tab 136 from engagement with notch 12. Contemporaneously, the turning of lift bar 40 via collar 83 and cable 90 pulls latch 146 counterclockwise to disengage the slave adjuster assembly. Release of handle 42 allows the weight of handle 42 or spring 141 or 142 to bias lift bar 40 back to the first angular release position illustrated in FIG. 7. Should either latch 130 or 136 fail to properly re-engage upon release of lift bar 40, re-engagement will occur on the next presented slot upon any movement of the respective upper channel 20. Furthermore, if desired, a torsion spring (not shown) may be added to lift bar 40 to ensure the return of lift bar 40 to the release position regardless of the lack of re-engagement of the latch 130 or 136.

Referring to FIGS. 9 through 13, the seat adjuster 207 of the present invention is shown with a vehicle seat 210 placed thereon. The seat adjuster 207 has a front end 202 and a rearward end 204. Projecting toward the front end 202 is a forward releasing rod 206 which is accessible to a seat occupant. Projecting rearwardly is a rear releasing rod 208 which is accessible to an occupant seated rearwardly of the seat adjuster 207 or the seat 210. The seat 210 ideally would be for intermediate seating in a van- or minivan-type vehicle.

Figure 10:
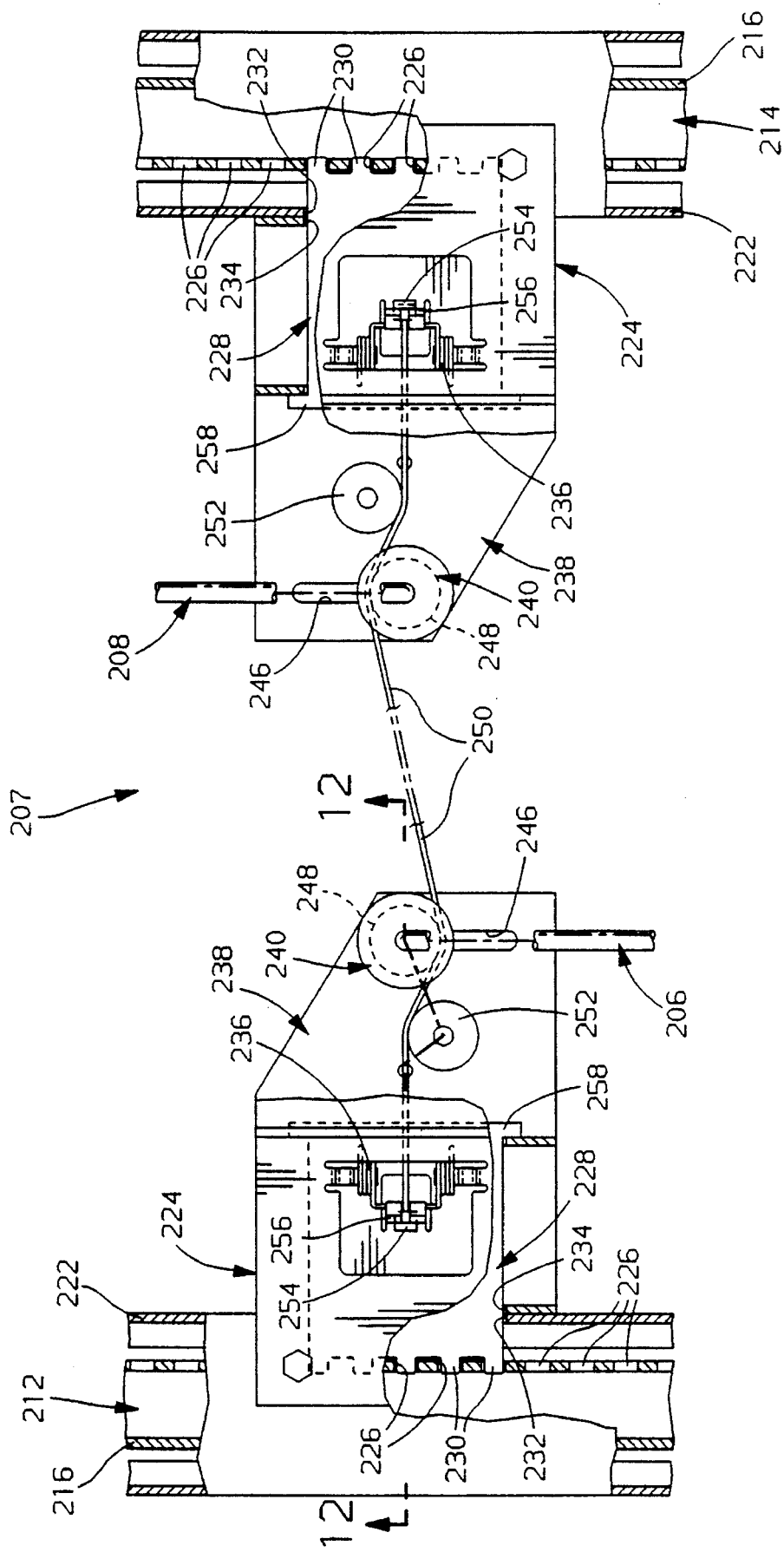
FIG. 10 is a top plane cut-away view with portions sectioned of the seat adjuster shown in FIG. 9.
Figure 11:
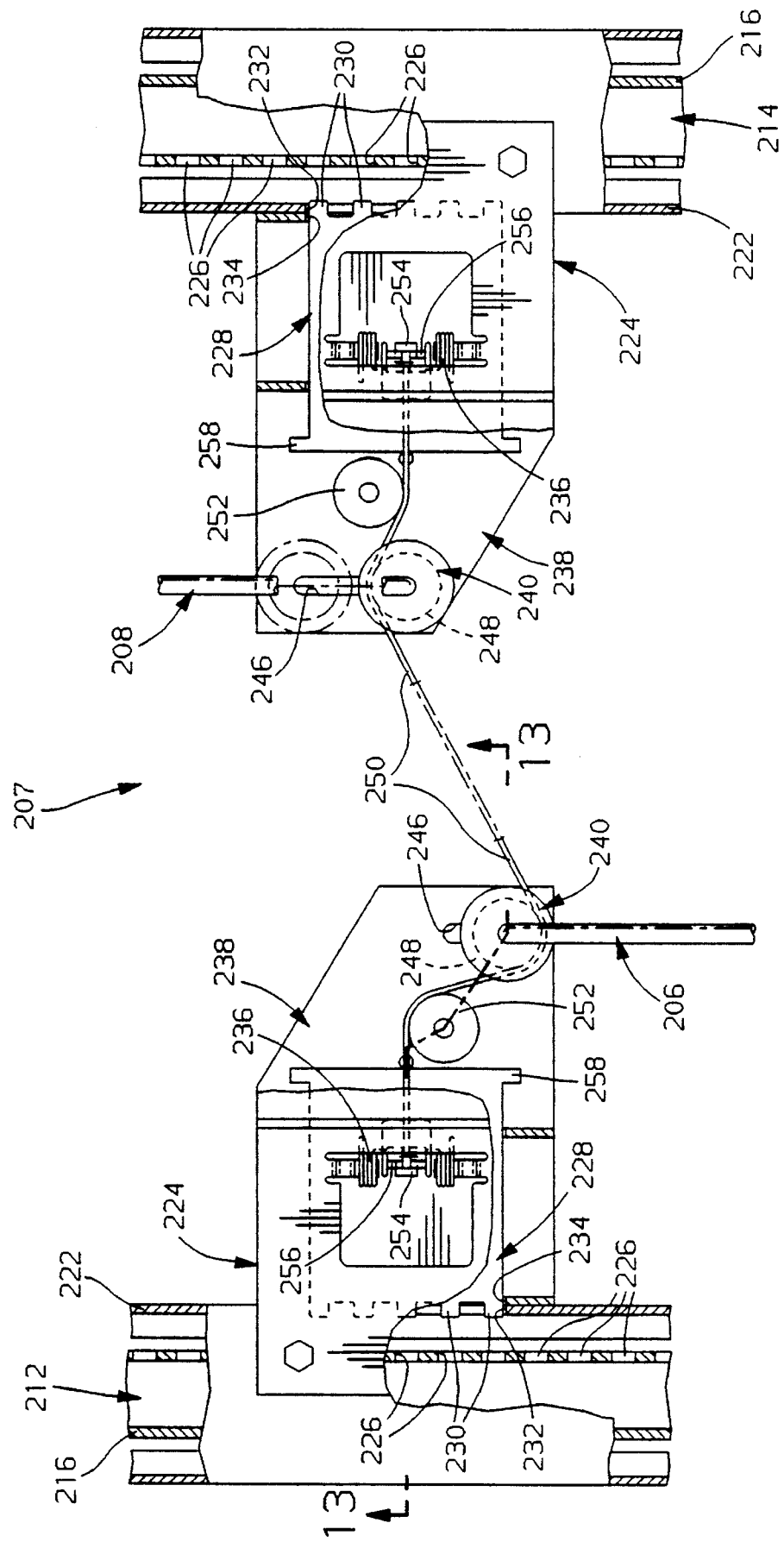
FIG. 11 is an operational view similar to that of FIG. 10 demonstrating displacement of a roller by a rod resulting in a tensioning of a cable connecting two latches and thereby removing the latches to a release position, allowing relative movement between a seat channel and a floor channel.
Figure 12:
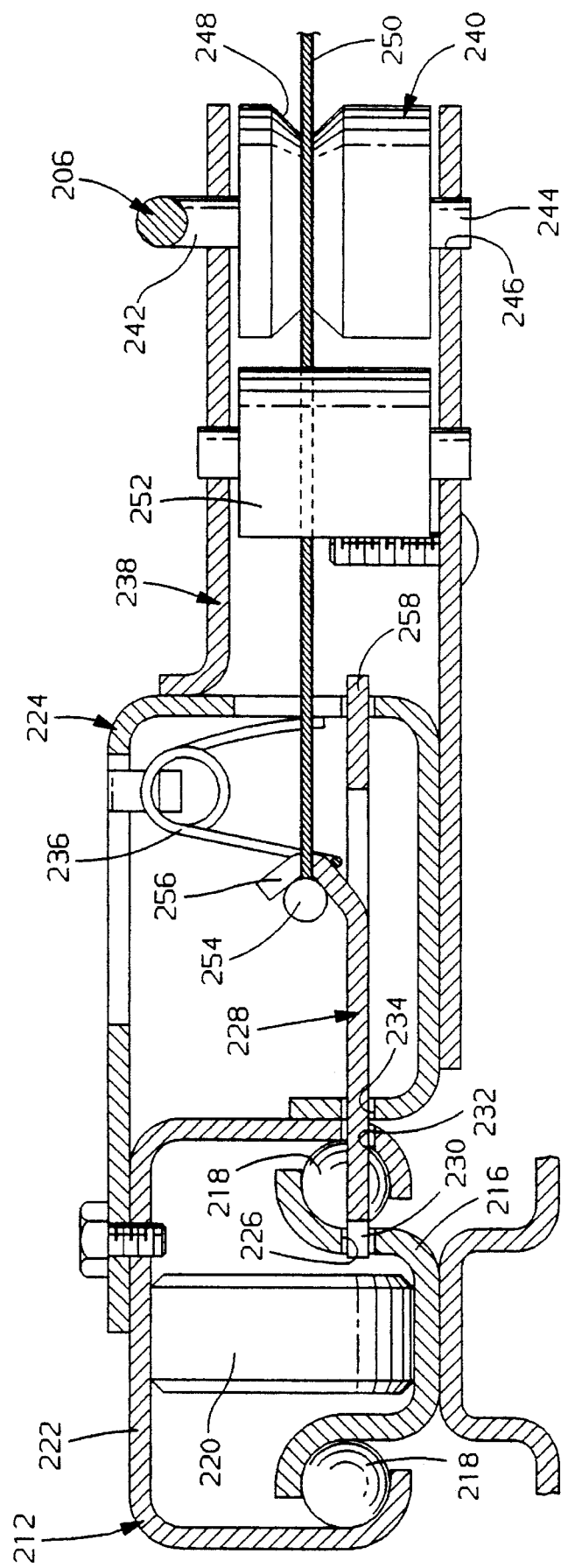
FIGS. 12 and 13 are enlarged section views of the seat adjuster as shown in FIGS. 10 and 11 and indicated with lines 12—12 and 13—13, respectively.

The adjuster 207 has two generally identical and symmetrical adjuster slides 212 and 214. Adjuster slide 212 has a floor channel 216. Slidably mounted on top of the floor channel 216 by encapsulated roller bearings 218 and roller 220 is a seat channel 222. Fixably connected to the seat channel by a bolt or formed integrally therewith is a side bracket 224. As best shown in FIGS. 10 and 11, the floor channel has a series of notches 226. Relatively mounted in a linear fashion with respect to bracket 224 is a latch 228. The latch 228 has a series of teeth 230 for selectively engagement with the notches 226 provided in the floor channel. Through holes 232, 234 on the seat channel provide horizontal alignment of the latch 228. The latch 228 is biased to an engaged or locking position by a spring 236. The spring is carried by the bracket 224.

The bracket 224 also has an extension 238. Extension 238 mounts a rotatable pin 240. Pin 240 has a rotational axis coterminous with a portion 242 of the rod 206, which has been bent downward to assume a generally vertical orientation. An extreme end 244 of portion 242 of the rod is captured within an elongated slot 246 provided in the floor of extension 238.

The pin 240 has a V-groove 248 for contacting a force transmission member cable 250. The cable 250 is connected to both latches 228. To help thread the cable 250, the extension 238 also rotatably mounts a secondary roller 252. A ball 254 crimped on the end of the cable 250 entraps the cable 250 within a slot 256 provided on the latch 228. An inboard end 258 of the latch is also held downwardly by a portion of the side bracket 224 (not shown).

Figure 13:
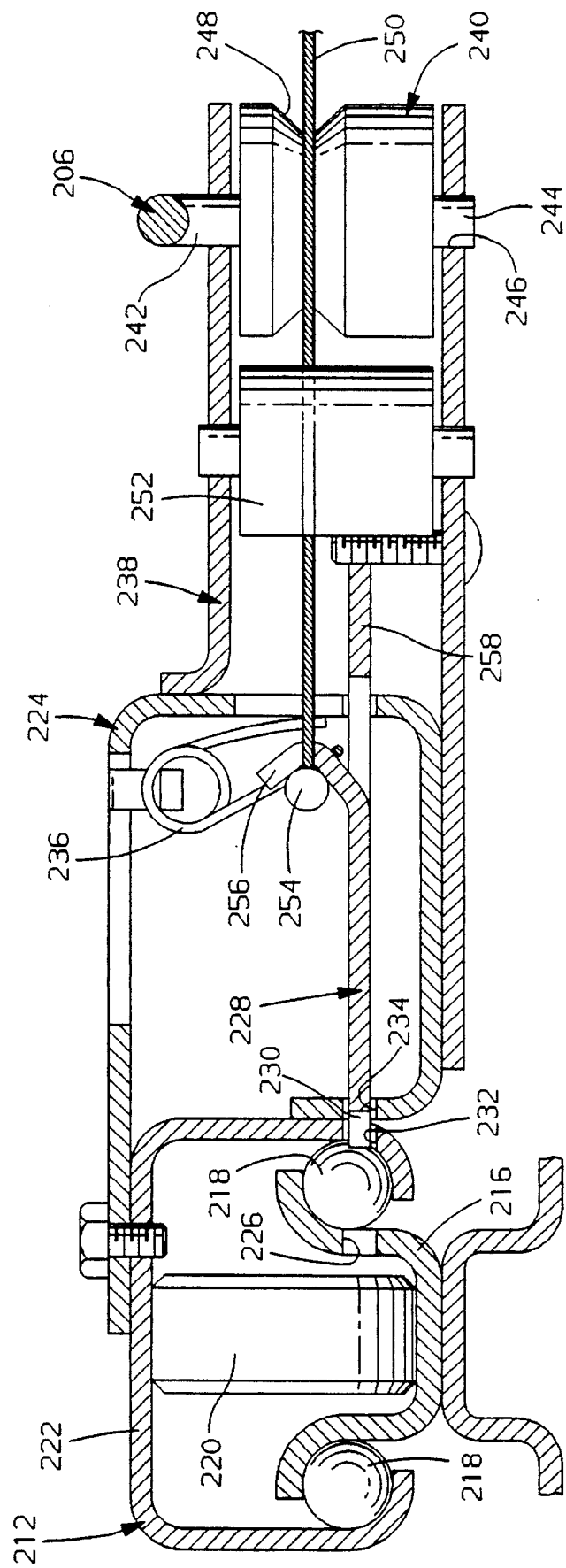

In the normal locked position, springs 236 push the latches 228 in an outboard direction, causing the teeth 230 of the latches 228 to engage with a plurality of notches 226 provided on the seat channel and also tensioning the cable 250. As best shown in FIGS. 11 and 13, when it is desired to release the adjuster 207 to allow for adjustment of the seat, the rod 206 is pulled forwardly, resulting in an increased tensioning of the cable 250. The tensioning of the cable 250 causes the latches 228 to be pulled in an inboard direction against the biasing of spring 236, disengaging the adjuster and allowing for positional adjustment of the seat 210. Since the slot 246 of the right-hand adjuster slide 214 extends rearwardly, the pulling forward of the pin 240 on adjuster slide 212 causes the pin 240 of the adjuster slide 214 to remain in its most forward position within its slot 246. Release of the rod 206 will cause the latches to re-engage as a result of the biasing spring 236 and will pull the pin 240 on adjuster slide 212 to its prior position. Operation of rod 208 will work in a similar fashion with functions being reversed.

Typically, although not shown, the rod 206 will be vertically supported underneath the seat 210 or by a side bracket not shown extending from the seat channel 222. Additionally, in an embodiment not shown, the rod 206 can be adapted for rotational rather than translational movement, having at an end a cam member making contact with a rearward end of the pin 240 to push it forwardly upon rotation of the rod.

While this invention has been described in terms of a preferred embodiment thereof, it will be appreciated that other forms could readily be adapted by one skilled in the art. Accordingly, the scope of this invention is to be considered limited only by the following claims.

I claim:

1. A manual vehicle seat adjuster, the adjuster comprising:
   a pair of generally parallel spaced floor channels;
   a series of notches fixed with respect to each floor channel;
   a pair of seat channels for mounting a vehicle seat, one of the seat channels being slidably mounted on each respective floor channel;
   a latch connected to each seat channel, the latch being mounted for relative movement with respect to the seat channel and being biased to a locked position engaging the notches fixed with respect to the floor channel locking the position of the seat channel with respect to the floor channel, and the latch having a release position removed from engagement with the notches fixed with respect to the floor channel, allowing adjustment of the seat channel with respect to the floor channel;

an extension member connected to at least one of the seat channels, the extension member having a slot;

a cable tensionally associated with both latches;

at least one pin connected to the extension member, the pin having a rotational axis relative with respect to the extension member, the pin rotational axis also being slidable in the extension member slot, and the pin being in contact with the cable; and a rod for displacing the pin within the slot of the extension member, thereby tensioning the cable and moving both latches to a release position.

2. A seat adjuster as described in claim 1 having two rods, one rod being accessible from a front end of the seat adjuster and a second rod being accessible from a rear end of the seat adjuster, each rod being operatively associated with a pin relatively mounted on the two seat channels allowing the seat adjuster to be actuated from the front end or the rear end.

3. A seat adjuster as described in claim 1 having a latch mounted for linear movement with respect to the seat channel.

4. A seat adjuster as described in claim 2 wherein the rods displace the respective pins in generally opposite directions to release the latches.

5. A seat adjuster as described in claim 1 further including a secondary rotational pin contacting the cable having a fixed axis with respect to the seat channel.

6. A manual vehicle seat adjuster, the adjuster comprising:

a pair of generally parallel spaced floor channels;

a series of notches fixed with respect to each floor channel;

a pair of seat channels for mounting a vehicle seat, one of the seat channels being slidably mounted on each respective floor channel;

a latch connected to each seat channel, the latch being mounted for relative movement with respect to the seat channel and being biased to a locked position engaging the notches fixed with respect to the floor channel locking the position of the seat channel with respect to the floor channel, and the latch having a release position removed from engagement with the notches fixed with respect to the floor channel, allowing adjustment of the seat channel with respect to the floor channel;

a force transmission member associated with both latches;

a first rod accessible by a seat occupant operatively associated with the force transmission member for tensioning the cable and moving both latches to a release position; and a second rod accessible from the rear of the seat adjuster operatively associated with the force transmission member for tensioning the cable and moving both latches to a released position.

* * * * *